United States Patent
Shafer

(10) Patent No.: US 9,350,978 B2
(45) Date of Patent: May 24, 2016

(54) METHOD OF DEFINING STEREOSCOPIC DEPTH

(75) Inventor: Anthony Shafer, Novato, CA (US)

(73) Assignee: Two Pic MC LLC, Burbank, CA (US)

( * ) Notice: Subject to any disclaimer, the term of this patent is extended or adjusted under 35 U.S.C. 154(b) by 576 days.

(21) Appl. No.: 12/495,477

(22) Filed: Jun. 30, 2009

(65) Prior Publication Data

US 2010/0302350 A1 Dec. 2, 2010

Related U.S. Application Data

(60) Provisional application No. 61/182,574, filed on May 29, 2009.

(51) Int. Cl.
*H04N 15/00* (2006.01)
*H04N 13/02* (2006.01)

(52) U.S. Cl.
CPC ....... *H04N 13/0296* (2013.01); *H04N 13/0278* (2013.01)

(58) Field of Classification Search
None
See application file for complete search history.

(56) References Cited

U.S. PATENT DOCUMENTS

| | | | | |
|---|---|---|---|---|
| 7,773,074 B2* | 8/2010 | Arenson et al. | | 345/173 |
| 9,025,007 B1* | 5/2015 | Parsons et al. | | 348/47 |
| 2002/0008906 A1* | 1/2002 | Tomita | | 359/462 |
| 2004/0118268 A1* | 6/2004 | Ludwig | | 84/645 |
| 2006/0123982 A1 | 6/2006 | Christensen | | |
| 2006/0232584 A1* | 10/2006 | Utsugi et al. | | 345/426 |
| 2008/0180438 A1 | 7/2008 | Sasaki et al. | | |
| 2008/0284982 A1* | 11/2008 | Richards et al. | | 352/38 |
| 2009/0109282 A1* | 4/2009 | Schnebly et al. | | 348/55 |
| 2009/0262184 A1* | 10/2009 | Engle et al. | | 348/47 |

OTHER PUBLICATIONS

Search/Examination Report dated Jun. 3, 2010 from New Zealand Patent Application No. 585744, 2 pages.
European Search Report mailed Oct. 16, 2012, EP Application No. 10164311.2, 6 pages.

* cited by examiner

*Primary Examiner* — Mehrdad Dastouri
*Assistant Examiner* — James M Anderson, II
(74) *Attorney, Agent, or Firm* — Kilpatrick Townsend & Stockton LLP

(57) ABSTRACT

A method for efficiently manipulating 3D scenes recorded by a virtual camera using a computer system comprised of projectors, graphics accelerators, one or more CPUs, instances of 3D rendering software, and a MIDI interface, includes receiving from the MIDI controller camera parameters, defining left camera and right camera parameters based on the camera parameters, determining left and right images based upon left and right camera parameters, projecting left and right images, viewing left and right images, integrating left and right images to represent a 3D scene, manipulating the 3D scene until the user is satisfied, and storing the left and right camera parameters, and storing the left and right images.

20 Claims, 5 Drawing Sheets

METHOD OF DEFINING STEREOSCOPIC DEPTH

CROSS-REFERENCES TO RELATED APPLICATIONS

Not Applicable

BACKGROUND OF THE INVENTION

The present invention relates to three-dimensional (3D) imaging. More particularly, the present invention relates to methods for efficiently manipulating 3D scenes.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and physical animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Physical-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Physical animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment physical animation techniques. For example, physical models could be represented by virtual models in computer memory, and manipulated.

Computer animation techniques are also applied to 3D images or scenes. 3D imaging is creating the illusion depth in an image or scene. Depth perception is created in the brain by providing the eyes of the viewer with two different images (left and right), representing two images of the same object, with the deviation similar to the minor difference between the image perceived by a viewer's left eye and the image perceived by a viewer's right eye.

One means of presenting different images to the two eyes is color filter glasses, for example the red/cyan anaglyph. In this scheme, one eye (e.g., left eye) views a scene through a red filter and the other eye (e.g., right eye) views a scene through a cyan filter. The scene includes portions in red and portions in cyan—red and cyan being chromatically opposite colors—such that both eyes perceive different images to create the illusion of depth. This scheme with it's low-cost cardboard glasses is commonly known due to its use dating back to 3D comic books in the 1950s and is enjoying a resurgence due it's use in 3D films released on DVD and Blu-ray Disc™.

Well-known drawbacks to using color filter glasses include that since each of the two-dimensional images are monochromatic, the three-dimensional image is also monochromatic, and not in full color. Another drawback is that by using a color filter or gel, the two-dimensional images provided to the viewer's eyes tend to be darker due to the filtering-out of colors.

Shuttered glasses typically include electrical or mechanical shutters that sequentially open and close to alternatively present right-eye images and left-eye image to a viewer. In such systems, a display alternatively displays a right-eye image and then a left-eye image, such that when the right-eye shutter is open, the viewer sees the right-eye image on the display, and when the left-eye shutter is open, the viewer sees the left-eye image on the display. A benefit of this technique includes that a single projector or display can be used to display both the right-eye image and left-eye image. Another benefit is that the perceived three-dimensional image can be in full color.

Drawbacks to such a scheme includes that the viewer must wear relatively costly glasses that have a mechanical or electronic shuttering mechanism. Furthermore, the glasses must include a mechanism to allow the shutters to be electronically synchronized to the appropriate fields of the display. Another drawback is that viewers sometimes report discomfort as the images flicker on the display.

Another means of presenting different images to the two eyes is polarized glasses. The left-eye images and right-eye images displayed to viewers are typically polarized using different polarization schemes, and the polarized glasses are also polarized in the same manner. Linear polarization may be used. In this scheme, two images are projected onto a screen through orthogonal polarizing filters. The projectors may receive their output from a computer, which generates the two images. The viewer views the scene through eyeglasses containing a pair of orthogonal polarizing filters. The viewer's eyes perceive two different images, because each filter allows only similarly polarized light through and blocks orthogonally polarized light. Linearly polarized glasses require that the viewer keep his or her head level, because tilting the viewing filters causes the left and right images to bleed into the other.

Circular polarization may also be used. As an example, a right eye image is polarized using a counter-clockwise circular polarization and displayed to the viewer, and at the same time, the left eye image is polarized using a clockwise circular polarization and displayed to the viewer. Because the right eye of the viewer's glasses have a polarization filter that transmits counter-clockwise circular polarized light, and the left eye of the viewer's glasses have a polarization filter that transmits clockwise circular polarized light, the left image is delivered to the left eye, and the right image is delivered to the right eye.

Both polarizing schemes have the benefit of relatively low cost pair of glasses to view such images. Additionally, the perceived three-dimensional images are in color. However drawbacks to such techniques include that two projectors are required to display the two images, each having different polarizations.

While viewing 3D images, the user may wish to manipulate the images by changing parameters of a virtual camera recording the images. For example, the user may wish to change the position of the camera in 3D space, aperture, lens, focus, focal length, field of view, and the like.

While wearing filtering glasses and operating a computer system to manipulate 3D images, it is challenging to keep the user focused on the screen at all times. The user may take off the glasses to operate the computer system, tilt the head to look at a computer output device (e.g., monitor), or tilt the head to look at a computer input device (e.g., keyboard and mouse). Each time, the viewer takes his or her eyes off the display and must reorient his or her head to resume viewing the scene, resulting in a loss of precious time.

Accordingly, what is desired are methods that address the problem described above.

BRIEF SUMMARY OF THE INVENTION

The present invention relates to the field of three-dimensional (3D) imaging. More particularly, the present invention relates to methods for efficiently manipulating 3D scenes.

Some embodiments of the present invention include a Musical Instrument Digital Interface (MIDI) controller for providing user input for controlling a 3D camera. Such a device may include sliders, knobs, buttons, pedals, sensors and the like to enable a viewer to direct the 3D camera without taking his or her eyes off of the 3D scene.

In various embodiments, two images (left-eye/right-eye) are generated and are respectively filtered as left-eye/and right-eye images of a 3D scene. The filtered images are then displayed on a display or projection surface. The glasses used by a viewer then allows the left-eye/right-eye image to reach the left/right eyes of a viewer. The viewer perceives a 3D image.

In some embodiments of the present invention, a user views and changes a 3D scene by manipulating controls on the 3D controller without moving the user's eyes away from the 3D scene.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
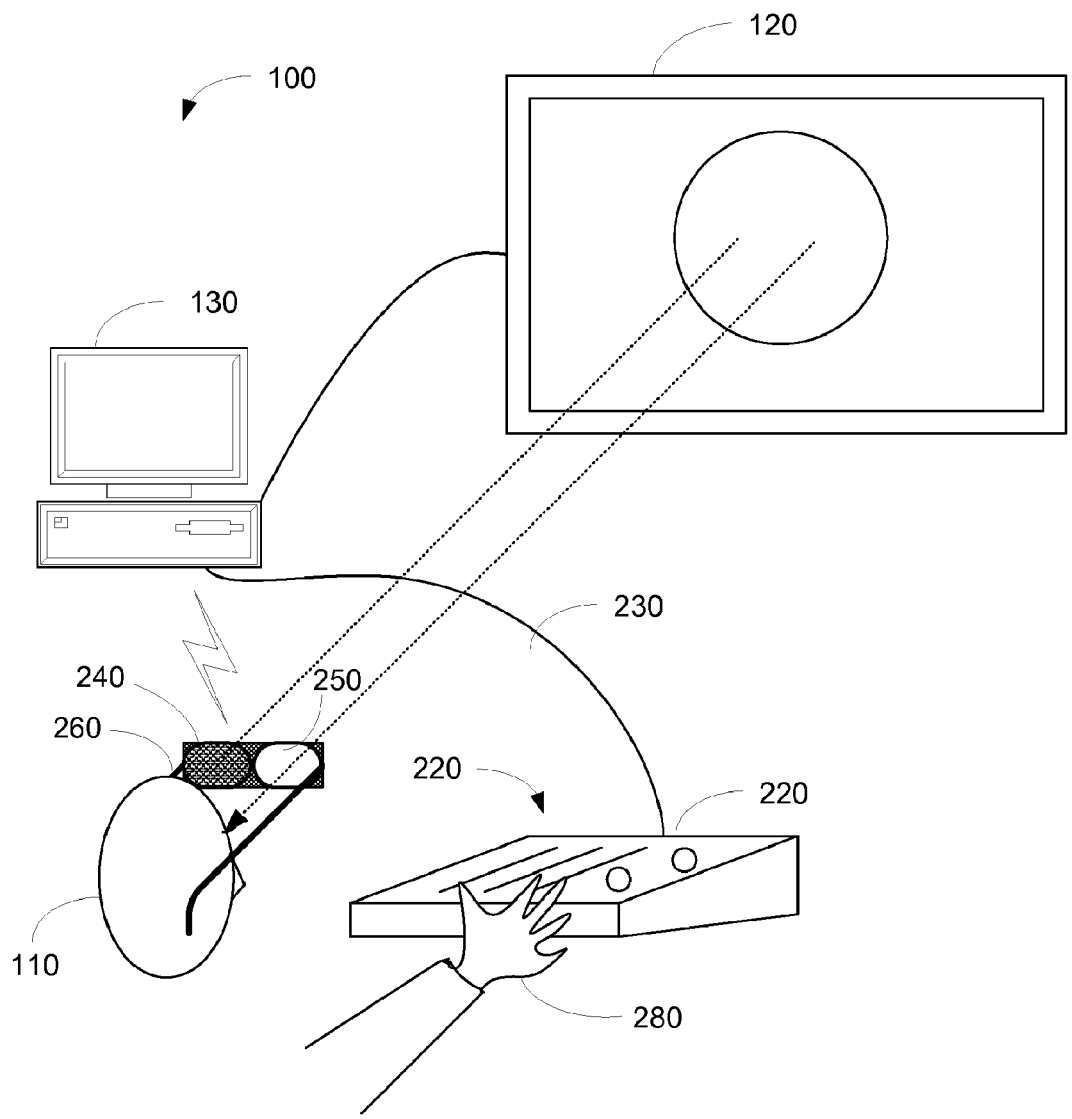
FIG. 1 illustrates an example of an embodiment of the present invention.

FIG. 1 is an overview of an embodiment of the present invention. Fig.1 includes an image projected onto projection surface 120 by a left image source and a right image source (e.g., projectors). In various embodiments, the left image source projects an image through a left filter onto projection surface 120 (e.g., a screen) as a left image, and the right image source projects an image through a right filter onto projection surface 120 as a right image. In various embodiments of the present invention, the left and right filters may be complementary or orthogonal filters, such as a right circular polarized filter and left circular polarized filter; horizontal polarized filter and vertical polarized filter; red filter and cyan filter; or the like. In various embodiments, the left and right images are superimposed and aligned on projection surface 120.

It will be appreciated that the projection apparatus described herein is illustrative and that variations and modifications are possible. For instance, the left image source and the right image source may be embodied as a single image source (not pictured) that alternately displays the left image and the right image. In such an embodiment, the left image and the right image may be alternately displayed every $1/60^{th}$ of a second, for example. In another embodiment of the present invention, with anaglyph-type images, the left image and the right image may be displayed at the same time on projection surface 120. In some embodiments of the present invention, projection surface 120 may be a cathode ray tube (CRT), plasma display, LCD display, digital light processing (DLP) display, an organic light emitting diode (OLED) display, reflective screen, and the like.

Also illustrated in the embodiment in FIG. 1 is a user 110, who views the projection surface 120 through glasses 260 having filters 240 and 250. Filters 240 and 250 are typically selected based upon the type of filters used for the left and right filters and, respectively. For example, if the left filter is a right circular polarizer, then filter 240 should also be a right circular polarizer; if the right filter is a vertical linear polarizer, then filter 250 should also be a vertical linear polarizer; if the left filter is a red filter, then filter 240 should also be a red filter; and the like.

In various embodiments of the present invention, when the left image and the right image are alternately displayed in time, glasses 260 may be embodied as shutter-type glasses where filters 240 and 250 may be electronically synchronized with the display field. In other embodiments, when the left image and the right image are part of an anaglyph image, glasses 260 may include red / cyan filters, or the like.

Also illustrated in FIG. 1 is a Musical Instrument Digital Interface (MIDI) controller 220. MIDI controller 220 is connected (e.g., via cable 230 or wireless connection) to computer 130. Computer 130 includes at least one processor and graphics accelerator cards (also known as display adapters or graphics cards). Graphics accelerator cards provide image data to left and right projectors. Using a hand 280 or other body parts, user 110 provides input to the computer through the MIDI controller 220.

In the present embodiment, MIDI controller 220 is typically embodied as a pad controller which may have banks of pads, faders, knobs, drawbar controller, piano-style keyboard, electronic drum triggers, pedal keyboards, electronic wind controllers, and the like. In embodiments of the present invention, MIDI controller 220 allows a user 110 to provide camera parameters to computer 130.

In embodiments of the present invention, graphics accelerator cards can include one or more graphics processors and memory. In embodiments of the present invention the function of graphics accelerator cards can be integrated into a single graphics accelerator card.

Figure 2A:
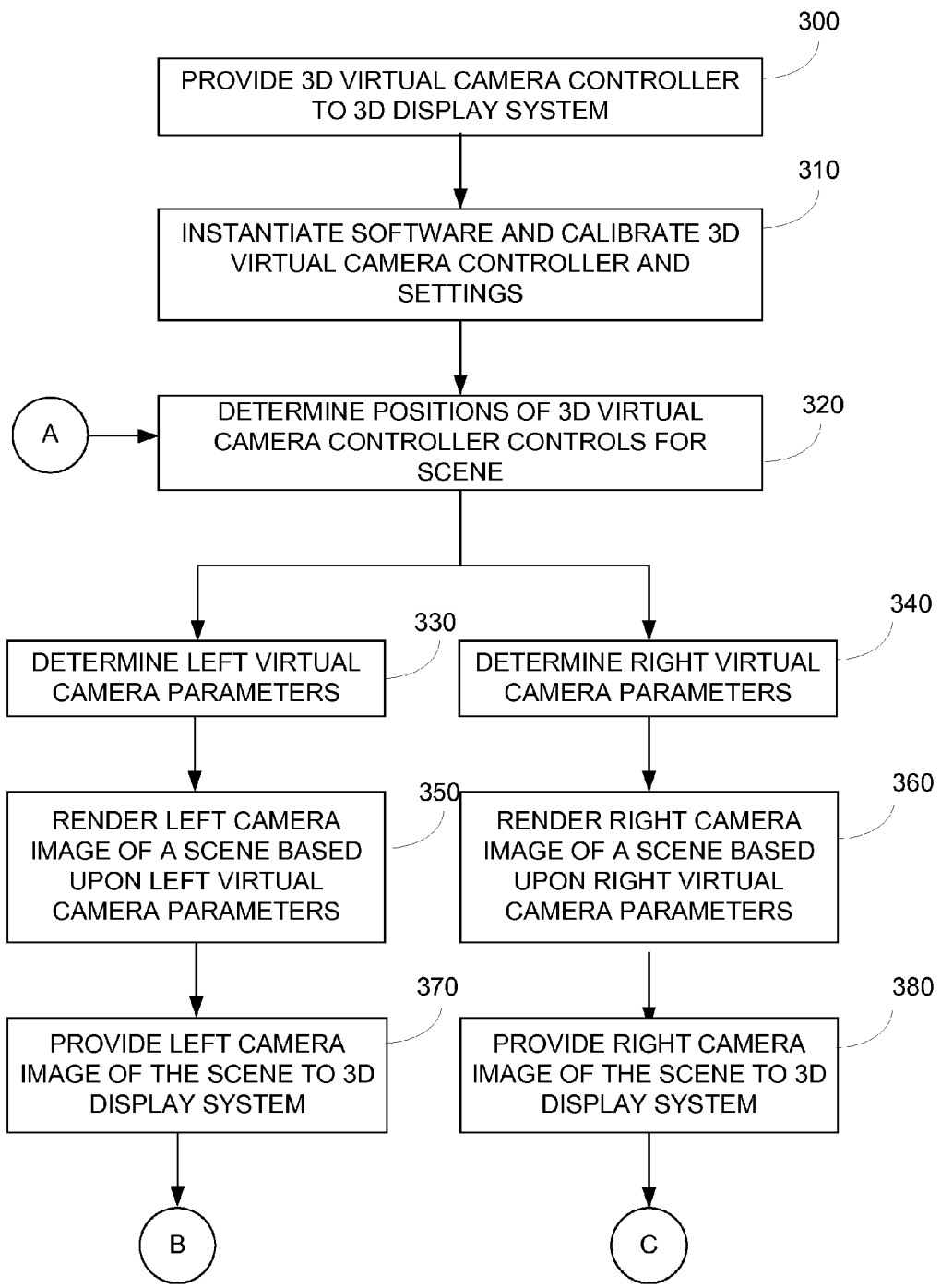
FIGS. 2A-C illustrate a flow diagram according to an embodiment of the present invention.
Figure 2B:
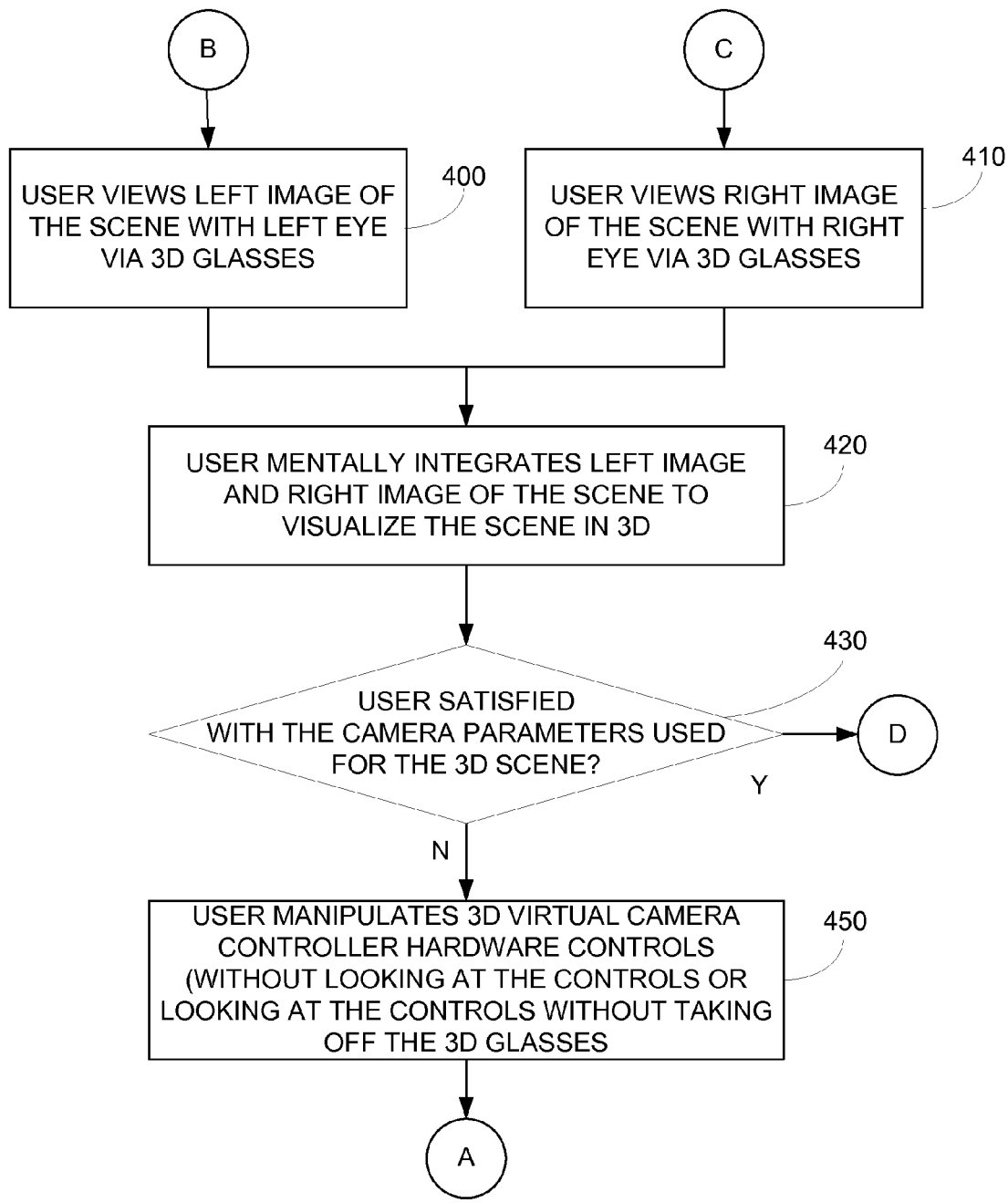
Figure 2C:
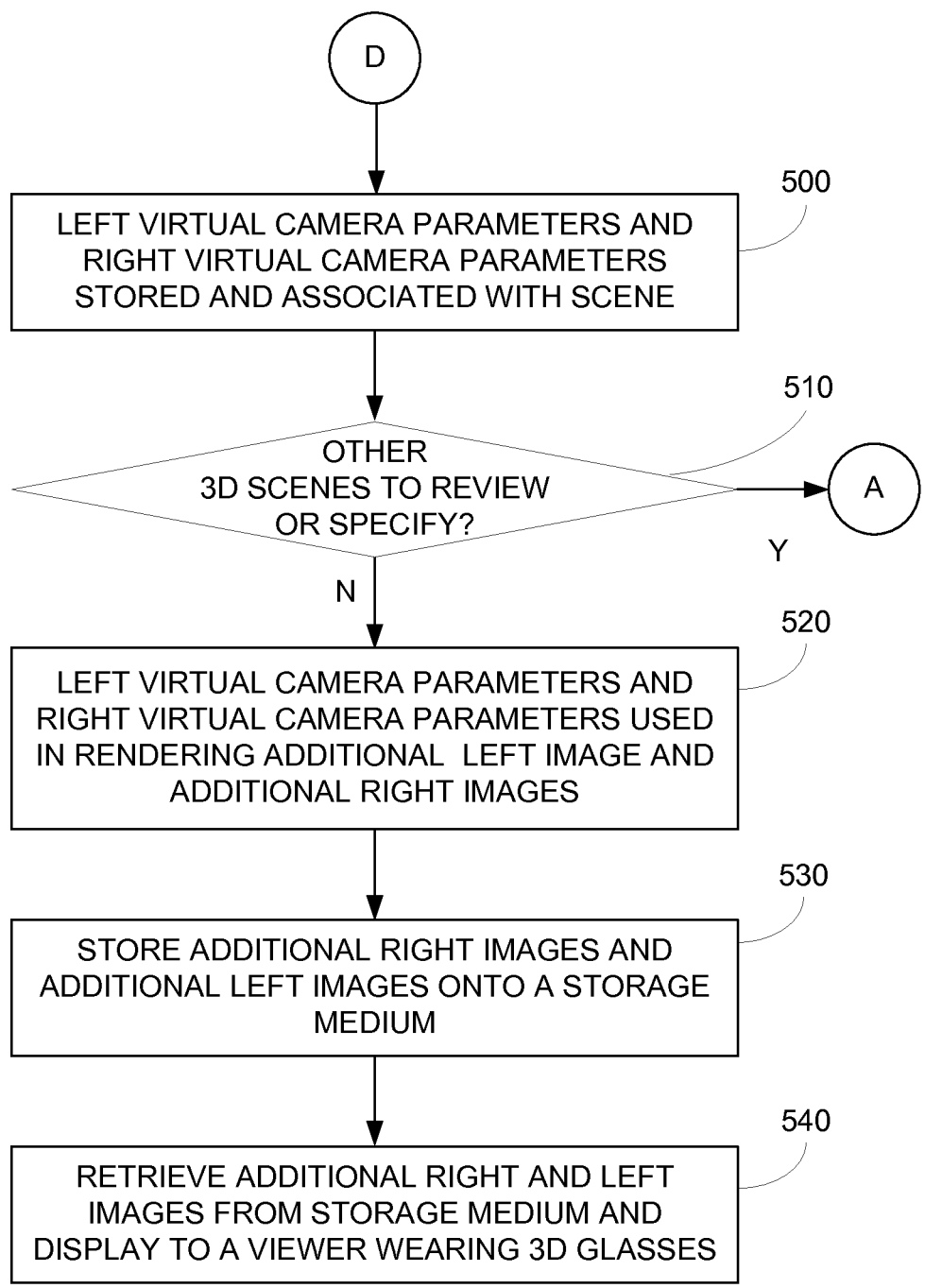

FIGS. 2A-2C illustrate portions of a flow diagram of a process according to various embodiments of the present invention. Initially, a viewer may be visualizing a three-dimensional image or series of images via one of the mechanisms described above. The user has a MIDI controller (Step 300) and 3D animation software is operating (Step 310). Based upon the positions of controls on the MIDI device, the MIDI device provides camera parameters to the computer system (Step 320). The software running on the computer system then sets parameters for a virtual left camera and a virtual right camera based upon the camera parameters from the MIDI device (Step 330, 340).

The left and right virtual cameras record a scene (Steps 350, 350). The left and right scenes recorded by the left and right virtual cameras are projected by left and right projectors (Steps 370, 380). The modified left and right scenes are perceived by the user's left and right eyes, respectively (Steps 400, 410). The user views the resulting 3D scene (Step 420).

If the user wishes to change the scene, then the user manipulates the MIDI controller to change parameters for the virtual camera without taking the polarizing glasses off or taking the user's eyes off of the display (Step 450). For example, the MIDI device may be visible to the user with the polarizing glasses on. For example, the users hand may be positioned over MIDI device with knobs, sliders, and the like, and the user manipulates the controls without looking at the MIDI device. For example, the user's feet may remain above a MIDI device with pedals and the like, and provide input by depressing the pedals without looking at the MIDI device. The MIDI device provides the camera parameters to the computer system and the process proceeds from Step 320.

If the user does not wish to change the scene, then the left and right virtual camera parameters are stored and associated with the scene (Step 500). If there are more 3D scenes to view, then the process proceeds from Step 320 with input from the MIDI controller. If there are no more 3D scenes to view, then the left and right virtual camera parameters are used to render left and right scenes (Step 520). The left and right scenes are stored (Step 530) and displayed to a viewer (Step 540).

Embodiments of the present invention are be used to control action in 3D games or otherwise interact with 3D environments where constant attention is advantageous. In some embodiments of the present invention, real-time games require the user to remain focus on the display and the 3D scene. For example, a user may miss a game-ending situation (e.g., hazardous condition) if the user's eyes are diverted from the display and 3D scene. The user may provide input to the MIDI device without removing the glasses or taking the user's eyes off of the display.

In other embodiments of the present invention, combinations or sub-combinations of the above disclosed invention can be advantageously made. It should be understood that combinations of blocks, additions of new blocks, re-arrangement of blocks, and the like are contemplated in alternative embodiments of the present invention.

The specification and drawings are, accordingly, to be regarded as illustrative rather than restrictive sense. It will, however, be evident that various modifications and changes may be made thereunto without departing from the broader spirit and scope of the invention as set forth in the claims.

Figure 3:
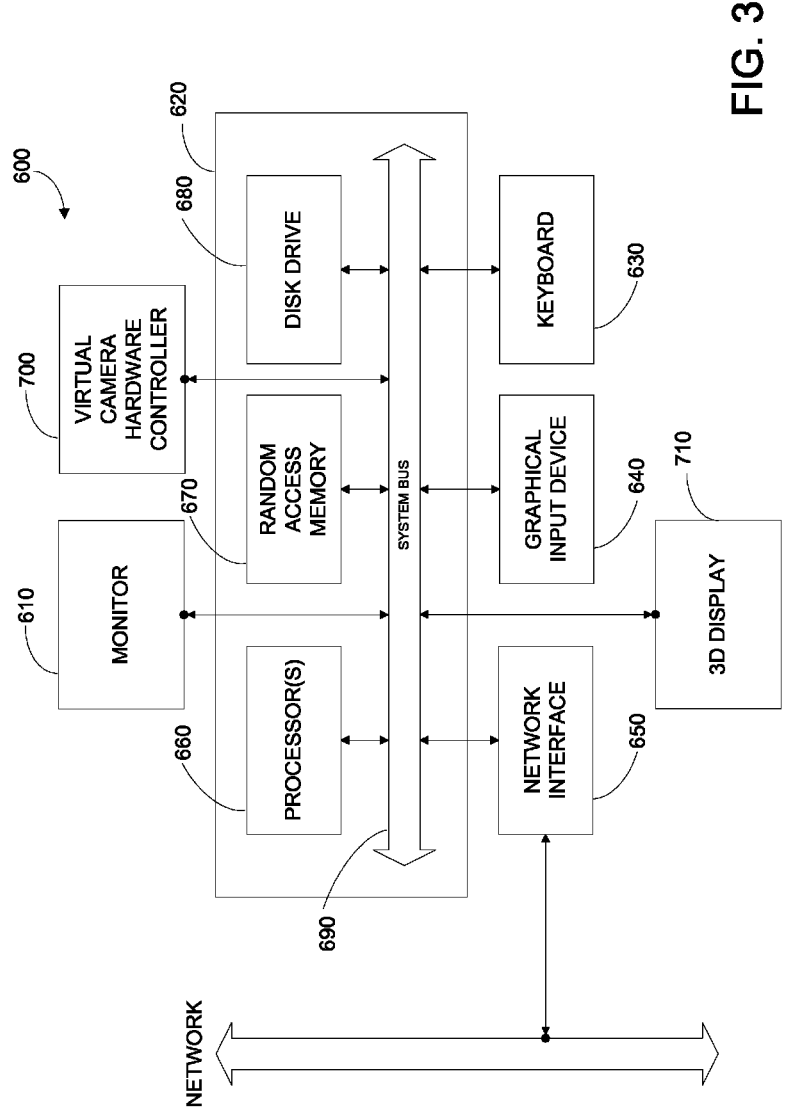
FIG. 3 illustrates a block diagram of a system according to one embodiment of the present invention.

FIG. 3 is a block diagram of typical computer system 600 according to an embodiment of the present invention.

In the present embodiment, computer system 600 typically includes a monitor 610, computer 620, a keyboard 630, a graphical user input device 640, a network interface 650, MIDI input device 700, and the like.

In the present embodiment, MIDI controller 700 is typically embodied as a pad controller which may have banks of pads, faders, and knobs, drawbar controller, piano-style keyboard, electronic drum triggers, pedal keyboards, electronic wind controllers, and the like In embodiments of the present invention, MIDI controller 700 allows a user to provide camera parameters to a processor or processors 660.

In the present embodiment, graphical user input device 640 is typically embodied as a computer mouse, a trackball, a track pad, wireless remote, and the like. Graphical user input device 640 typically allows a user to select objects, icons, text and the like that appear on the monitor 610.

Embodiments of network interface 650 typically include an Ethernet card, a modem (telephone, satellite, cable, ISDN), (asynchronous) digital subscriber line (DSL) unit, and the like. Network interface 650 are typically coupled to a computer network as shown. In other embodiments, network interface 650 may be physically integrated on the motherboard of computer 620, may be a software program, such as soft DSL, or the like.

Computer 620 typically includes familiar computer components such as a processor or processors 660, and memory storage devices, such as a random access memory (RAM) 670, disk drives 680, and system bus 690 interconnecting the above components.

In one embodiment, computer 620 is a PC compatible computer having multiple microprocessors such as Xeon™ microprocessor from Intel Corporation. Further, in the present embodiment, computer 620 typically includes a UNIX-based operating system.

RAM 670 and disk drive 680 are examples of tangible media for storage of data, audio/video files, computer programs, applet interpreters or compilers, virtual machines, embodiments of the herein described invention including geometric scene data, object data files, shader descriptors, a rendering engine, output image files, texture maps, displacement maps, scattering lengths and absorption data of object materials, and the like. Other types of tangible media include floppy disks, removable hard disks, optical storage media such as CD-ROMs, DVDs, Blu-ray Disc, and bar codes, semiconductor memories such as flash memories, read-only-memories (ROMs), battery-backed volatile memories, networked storage devices, and the like.

In the present embodiment, computer system 600 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 3 is representative of computer systems capable of embodying the present invention. It will be readily apparent to one of ordinary skill in the art that many other hardware and software configurations are suitable for use with the present invention. For example, the use of other micro processors are contemplated, such as Core™ or Pentium™ microprocessors; Opteron™, Phenom™ or AthlonXP™ microprocessors from Advanced Micro Devices, Inc; PowerPC G4™ microprocessors from Freescale Semiconductor, Inc.; PowerPC G5™ microprocessors from IBM; and the like. Further, other types of operating systems are contemplated, such as Windows® operating system such as Windows Vista®, WindowsXP®, or the like from Microsoft Corporation, Solaris from Sun Microsystems, LINUX, UNIX, MAC OS from Apple Computer Corporation, and the like.

What is claimed is:

1. A method for a computer system being used by a user wearing a pair of 3D filtering glasses with a right lens and a left lens, the left lens and the right lens comprised of complimentary filters, the method comprising:

while the user wears the 3D filtering glasses, providing the user with a left-eye image of a scene to the left eye of the user and a right-eye image of the scene to the right eye of the user;

receiving, at the computer system, input settings associated with a virtual left camera and a virtual right camera, wherein the input settings are received at the computer system from a controller comprising a plurality of physically manipulable camera control devices, wherein a first of the input settings is associated with a position of a first of the physically manipulable camera control devices, the position of the first physically manipulable camera control device being set by the user while concurrently both wearing the 3D filtering glasses and viewing the left-eye and right-eye images of the scene, wherein a second of the input settings is associated with a position of a second of the physically manipulable camera control devices, the position of the second physically manipulable camera control device being set by the user while concurrently both wearing the 3D filtering glasses and viewing the left-eye and right-eye images of the scene, and wherein the first physically manipulable camera control device is coupled to a housing of the controller and the second physically manipulable camera control device is coupled to the housing of the controller;

determining, at the computer system a first plurality of the virtual camera parameters associated with the virtual left camera in response to the input settings;

determining, at the computer system a second plurality of the virtual camera parameters associated with the virtual right camera in response to the input settings;

rendering a revised left-eye image of the scene in response to the first plurality of virtual camera parameters;

rendering a revised right-eye image of the scene in response to the second plurality of virtual camera parameters; and while the user continues to wear the 3D filtering glasses, providing the user with the revised left-eye image of the scene to the left eye and the revised right-eye image of the scene to the right eye of the user.

2. The method of claim 1, wherein the complimentary filters are linearly polarized.

3. The method of claim 1, wherein the complimentary filters are circularly polarized.

4. The method of claim 1, wherein the complimentary filters are red/cyan.

5. The method of claim 1, wherein the first and second physically manipulable camera control devices comprise a MIDI control interface.

6. The method of claim 1, wherein the left image is provided to the user by a first projector and the right image is provided to the user by a second projector.

7. The method of claim 1, further comprising:
storing the first plurality and the second plurality of virtual camera parameters;
rendering additional left-eye images and right-eye images; and
storing the additional left-eye images and right-eye images.

8. The method of claim 1, wherein the position of the first of the physically manipulable camera control devices comprises a position of at least one of a knob, slider, button, pedal or sensor.

9. A system for controlling a virtual left camera and a virtual right camera, the method comprising:
a computer system;
a controller; and
a first physically manipulable camera control device on the controller operable by a user while concurrently both wearing 3D filtering glasses and viewing a scene rendered in 3D in the 3D filtering glasses, wherein the 3D filtering glasses comprise a right lens and a left lens, the left lens and the right lens comprised of complimentary filters, wherein the scene comprises a left-eye image of the scene and a right-eye image of the scene, and wherein a position of the first physically manipulable camera control device is associated with a parameter of the virtual left camera;
a second physically manipulable camera control device on the controller operable by the user while concurrently both wearing the 3D filtering glasses and viewing the scene rendered in 3D in the 3D filtering glasses, wherein the position of the second physically manipulable camera control device is associated with a parameter of the virtual right camera;
wherein the first physically manipulable camera control device is coupled to a housing of the controller and the second physically manipulable camera control device is coupled to the housing of the controller;
wherein the controller is communicatively coupled to the computer system and is configured to communicate the position of the first physically manipulable camera control device and the position of the second physically manipulable camera control device to the computer system;
wherein the computer system is configured to render a revised left-eye image of the scene based on a virtual left camera parameter determined in response to the position of the first physically manipulable camera control device and a revised right-eye image of the scene based on a virtual right camera parameter determined in response to the position of the second physically manipulable camera control device.

10. The system of claim 9, wherein the first physically manipulable camera control device and the second physically manipulable camera control device includes at least one of a knob, slider, button, pedal or sensor.

11. The method of claim 1, further comprising receiving input settings associated with at least one of the virtual left camera and the virtual right camera from a position of a third physically manipulable camera control device, wherein the third physically manipulable camera control device is coupled to the housing of the controller.

12. The method of claim 11, wherein the controller is a MIDI controller.

13. The method of claim 1, wherein the first plurality of the virtual camera parameters associated with the virtual left camera comprises at least one of a position in 3D space, aperture, lens, focus, focal length or field of view.

14. The system of claim 9, further comprising a third physically manipulable camera control device operable by the user, wherein the position of the third physically manipulable camera control device is associated with a parameter of at least one of the first virtual camera and the second virtual camera.

15. The system of claim 9, wherein the controller is a MIDI controller.

16. The system of claim 9, wherein the parameter of the virtual left camera is a position of the virtual left camera in 3D space, aperture, lens, focus, focal length or field of view.

17. The method of claim 1, the position of the second of the physically manipulable camera control devices comprises a position of at least one of a knob, slider, button, pedal or sensor.

18. The method of claim 1, wherein the second plurality of the virtual camera parameters associated with the virtual right camera comprises at least one of a position in 3D space, aperture, lens, focus, focal length or field of view.

19. The system of claim 9, wherein the parameter of the virtual right camera is a position of the virtual right camera in 3D space, aperture, lens, focus, focal length or field of view.

20. The system of claim 9, wherein the complimentary filters form either a linearly polarized pair, a circularly polarized pair, or a red/cyan pair.

* * * * *